J. W. NYSTROM & A. YOUNG.
Telescopes.

No. 153,494.

Patented July 28, 1874.

Witnesses.

Inventors.
John W. Nystrom
Alfred Young

UNITED STATES PATENT OFFICE.

JOHN W. NYSTROM AND ALFRED YOUNG, OF PHILADELPHIA, PA.

IMPROVEMENT IN TELESCOPES.

Specification forming part of Letters Patent No. 153,494, dated July 28, 1874; application filed June 29, 1874.

*To all whom it may concern:*

Be it known that we, JOHN W. NYSTROM and ALFRED YOUNG, both of the city and county of Philadelphia, in the State of Pennsylvania, have jointly invented a new and Improved Construction of Telescope, for the purpose of securing greater accuracy and more simplicity of such instruments than have heretofore been attained; and we hereby declare that the following is a full and exact description thereof, reference being had to the accompanying drawing and letters marked thereon.

The nature of our invention consists in moving only the erectors for regulating the telescope into focus, while the object-glass and the cross-hairs remain stationary at a permanent distance from each other, their relative position remaining undisturbed in the operation of focusing the telescope.

The erector in a terrestrial telescope is placed between the object-glass and the eye-piece, for the purpose of reversing the inverted image formed in the focus of the object-glass to an erect image in the eye-piece.

To enable others skilled in the art to make and use our invention, we will proceed to describe its construction and operation.

We construct an ordinary terrestrial telescope; but instead of connecting the eye-piece with the erector, and moving the system simultaneously, as has heretofore been done, we fasten the eye-piece permanently to the telescope, and move only the erector for the purpose of regulating the lenses into focus, which operation will be understood by the accompanying drawings.

Figure 1:
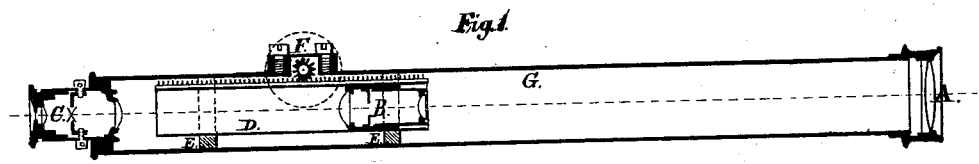

Figure 1 represents a longitudinal section through the center line of telescope, showing object-glass A, erector B, and eye-piece C. The erector is placed in a small tube, D, which is guided by two rings, E E, and moved by a rack and pinion, F, for the purpose of regulating the telescope into focus of a distant object. The object-glass A and the eye-piece with the cross-hairs C remain stationary in the principal tube G, which condition secures a very correct instrument, and less liable to derangement.

In the instruments for surveying and leveling, with the telescopes heretofore constructed with erectors, all the lenses, including the object-glass, are moved for regulating the focus, and the cross-hairs are placed in front of the erector, which conditions cannot constitute so reliable an instrument as when the most important parts are permanently fixed in the telescope, and cross-hairs placed in the eye-piece.

Figure 2:
Figure 3:
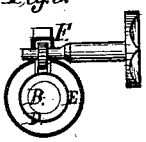
Figure 4:
Figure 5:
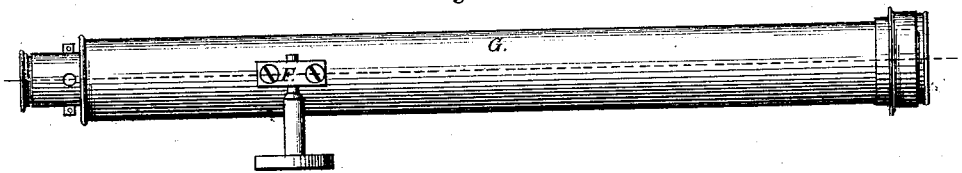

Fig. 2 represents an end view of eye-piece C. Fig. 3 represents a cross-section through rack and pinion F. Fig. 4 represents an end view of object-glass A. Fig. 5 represents an outside view of the telescope.

Our invention of moving only the erector can be used in all telescopes in which an erector is used.

We do not confine ourselves to any particular mechanism for moving the erector, which can be moved by a screw or by a rack placed in a different position.

What we claim as our invention, and desire to secure by Letters Patent, is—

The combination of longitudinally-adjustable erector with stationary eye-piece and object-glass in telescopes, substantially as and for the purpose described.

JOHN W. NYSTROM.
ALFRED YOUNG.

Witnesses:
J. McCOLGAN,
ROBT. E. PATTISON.